United States Patent
Bedjaoui et al.

(10) Patent No.: US 8,591,602 B2
(45) Date of Patent: Nov. 26, 2013

(54) LITHIUM MICROBATTERY COMPRISING AN ENCAPSULATING LAYER AND FABRICATION METHOD

(75) Inventors: Messaoud Bedjaoui, Echirolles (FR); Steve Martin, Saint Sauveur (FR)

(73) Assignee: Commissariat a l'Energie Atomique, Paris (FR)

( * ) Notice: Subject to any disclaimer, the term of this patent is extended or adjusted under 35 U.S.C. 154(b) by 887 days.

(21) Appl. No.: 12/458,866

(22) Filed: Jul. 24, 2009

(65) Prior Publication Data
US 2010/0068617 A1 Mar. 18, 2010

(30) Foreign Application Priority Data
Sep. 16, 2008 (FR) .................................. 08 05074

(51) Int. Cl.
- H01M 2/02 (2006.01)
- H01M 2/08 (2006.01)
- H01M 6/18 (2006.01)
- H01M 6/02 (2006.01)
- H01M 6/40 (2006.01)

(52) U.S. Cl.
USPC .......... 29/623.1; 29/623.5; 429/124; 429/162

(58) Field of Classification Search
USPC ................. 429/124, 126–127, 162–163, 177; 29/623.1–623.5
See application file for complete search history.

(56) References Cited

U.S. PATENT DOCUMENTS

| | | | |
|---|---|---|---|
| 4,985,340 A * | 1/1991 | Palazzotto et al. | 430/270.1 |
| 5,642,211 A * | 6/1997 | Okano et al. | 349/41 |
| 6,387,563 B1 | 5/2002 | Bates | |
| 6,994,933 B1 | 2/2006 | Bates | |
| 2002/0008837 A1 * | 1/2002 | Hisamitsu et al. | 349/175 |
| 2002/0071989 A1 | 6/2002 | Verma et al. | |
| 2002/0164543 A1 * | 11/2002 | Lin et al. | 430/313 |
| 2004/0142190 A1 * | 7/2004 | Kawai et al. | 428/461 |
| 2005/0141170 A1 | 6/2005 | Honda et al. | |
| 2005/0277027 A1 * | 12/2005 | Kim et al. | 429/326 |
| 2007/0048604 A1 | 3/2007 | Gaillard et al. | |
| 2007/0091543 A1 | 4/2007 | Gasse et al. | |
| 2007/0117917 A1 * | 5/2007 | Herr et al. | 524/556 |
| 2007/0212589 A1 * | 9/2007 | Kobuchi et al. | 429/38 |
| 2008/0044732 A1 | 2/2008 | Salot et al. | |
| 2009/0053603 A1 * | 2/2009 | Hoshiba et al. | 429/217 |

FOREIGN PATENT DOCUMENTS

| | | |
|---|---|---|
| EP | 1 488 917 A1 | 12/2004 |
| FR | 2 861 218 A1 | 4/2005 |
| FR | 2 862 436 A1 | 5/2005 |
| WO | WO 01/73875 A1 | 10/2001 |
| WO | WO 02/47187 A1 | 6/2002 |
| WO | WO 2006/101182 * | 9/2006 |
| WO | WO 2008/011061 A1 | 1/2008 |

OTHER PUBLICATIONS

Decker et al. (2001). UV-radiation curing of acrylate/epoxide systems. Polymer, 42, 5531-5541.*

* cited by examiner

Primary Examiner — Jonathan Crepeau
Assistant Examiner — Jacob Buchanan
(74) Attorney, Agent, or Firm — Oliff & Berridge, PLC

(57) ABSTRACT

A lithium microbattery formed by a stack of thin layers on a substrate which comprises two current collectors, a positive electrode, a solid electrolyte layer, a negative electrode and an encapsulating layer. The encapsulating layer is formed by a protective layer made from polymer material on which a barrier layer is arranged. The protective layer comprises a copolymer formed from a homogeneous mixture of at least two photopolymerizable precursor materials, respectively acrylate-based and epoxide-based.

7 Claims, 4 Drawing Sheets

LITHIUM MICROBATTERY COMPRISING AN ENCAPSULATING LAYER AND FABRICATION METHOD

BACKGROUND OF THE INVENTION

The invention relates to a lithium microbattery comprising an encapsulating layer formed by a protective layer of polymer material on which a barrier layer is arranged.

The invention also relates to a fabrication method of such a microbattery.

STATE OF THE ART

Microbatteries, also called "all solid-state batteries", find numerous industrial applications in particular in the field of microelectronics wherein component miniaturization and autonomy requirements impose the use of increasingly small, more powerful storage batteries with longer lifetimes. Microbatteries come in the form of a stack of solid thin layers successively deposited on a substrate by conventional techniques of the microelectronics industry in particular by physical vapor deposition (PVD), chemical vapor deposition (CVD) and lithography techniques.

Lithium microbatteries are particularly interesting on account of their high mass density, their high effective surface of energy storage and their low toxicity. Nevertheless, these lithium microbatteries are very sensitive to air and in particular to moisture. In the presence of water or oxygen, the lithium negative electrode oxidizes to respectively give lithium hydroxide (LiOH) or lithium oxide ($Li_2O$). This phenomenon in the long run leads to a loss of the microbattery performances. To remedy this shortcoming, the microbattery is generally covered with an impermeable coating, compatible with the microbattery components, which encapsulates the lithium microbattery and thereby forms a barrier against contaminants. The commonly used barrier layers are polymer, ceramic or metal layers.

Other shortcomings also limit the use of these microbatteries in microelectronics or affect their performances. The thermal instability of lithium at high temperature is a particularly limiting point for integration of lithium microbatteries in microelectronic devices.

Finally, operation of the lithium microbattery being based on transportation of the current by the lithium ions, when the microbattery is charged and discharged, the electrodes undergo deformations due to insertion and extraction, also called de-insertion, of the lithium ions in the electrodes. These repeated modifications of volume rapidly cause mechanical damage, in particular losses of contact between the negative electrode and the corresponding current collector.

Recent works have proposed new microbattery configurations to palliate these shortcomings. For example, the document US-A-2007048604 describes a microbattery comprising a protective envelope having at least two superposed and distinct layers, a first layer and second layer. The first layer comprises a material that is inert with respect to the metallic lithium constituting the anode. The material of the first layer is selected from a hydrogenated amorphous silicon carbide, a hydrogenated amorphous silicon oxycarbide, hydrogenated amorphous carbon, fluorinated amorphous carbon and hydrogenated amorphous silicon. The material of the second layer is selected from a hydrogenated amorphous silicon carbonitride, a hydrogenated amorphous silicon nitride and fluorinated amorphous carbon.

The document US-A-2007091543 describes a protective layer for a microbattery formed by a metal or a metal alloy. This protective layer can be associated with an insulating layer if desired.

The document US-A-2005141170 discloses a multilayer structure of trapezoid shape covered on its side parts by a protective layer formed from a metal film of metal oxide, metal nitride, composite or resins such as epoxy resins or acrylate resins.

The document US-A-2002071989 proposes a protective layer successively formed by two dielectric layers, for example of aluminium oxide and silicon dioxide, and a sealing layer covering the dielectric layers.

The document U.S. Pat. No. 6,387,563 describes a protective layer for a battery comprising an epoxy layer 41 under a layer of ceramic 40.

The document US-A-2008044732 describes a microbattery encapsulated in conventional manner by one or more barrier layers of polymer, ceramic or metal, having the particularity of comprising a nanostructured electrode. The electrode is formed by nanotubes or nanowires, preferably containing germanium, silicon, silver, tin or carbon, spaced apart so as to form cavities inside the electrode. The architecture of this electrode enables the variations of volume of the electrode on charging and discharging of the microbattery to be compensated thereby reducing the mechanical stresses. However, this structure is not suitable for a metal lithium-base negative electrode.

International Patent application WO2008/011061 discloses a microbattery comprising a multilayer encapsulating layer. The encapsulating layer comprises an alternation of at least one layer of organic polymer, such as epoxy, polyimide or silicone, and a metal layer. The organic polymer layer attenuates the surface defects and roughness and provides a flat support for deposition of the metal layer. In this encapsulating layer, the metal layer prevents the contaminants from migrating inside the microbattery. However, the suggested organic polymers are not compatible with lithium microbatteries. Polyimides in fact contain solvents fostering emission of water vapor and are therefore incompatible with metal lithium. Furthermore, although epoxy resins are thermally very stable, they present a rigidity which does not enable them to absorb the mechanical stresses present during operation of the microbattery. In addition, such resins are known not to be totally inert with respect to lithium ions. A certain quantity of $Li^+$ ions can be inserted in the epoxy resin thereby limiting the ability of the lithium ions to migrate to the positive electrode. Finally, silicone resins are known to be hardly compatible with metal layers commonly used in microelectronics. Incompatibility between different layers constituting the encapsulation can however give rise to detachments at the interfaces and affect the integrity of the microbattery.

U.S. Pat. No. 6,994,933 proposes to encapsulate a lithium microbattery with a composite formed by a first layer of acrylate or polyolefin polymer and one or more barrier layers. The first polymer layer covers the stack of thin layers of the microbattery and enables a hole-free surface presenting little roughness to be formed, on which the successive barrier layers are deposited, the thickness of the latter then being more homogeneous. The barrier layer(s) are selected from ceramic, metal or polymer layers. This homogeneity enhances their property of acting as barrier for contaminants. However, acrylate and polyolefin polymers have thermal resistances of less than 230° C. To integrate a microbattery in a microelectronics device however, this microbattery is generally electrically connected by soldering the current collectors by means of a solder reflow method. This method is implemented at a temperature of 260° C. for 10 mins. The thermal instability of acrylate and polyolefin polymers therefore makes use of such a microbattery in microelectronics difficult.

OBJECT OF THE INVENTION

The object of the invention is to propose a microbattery remedying the shortcomings of the prior art and its fabrication method.

In particular the object of the invention is to provide a microbattery comprising an encapsulating layer acting as airtight barrier, that is inert with respect to the microbattery components and compatible with the industrial method of microelectronics, in particular with the solder reflow method.

It is a further object of the invention to provide a lithium microbattery presenting a good mechanical strength and thermal resistance obtained by means of an industrializable fabrication method.

According to the invention, this object is achieved by a lithium microbattery and a fabrication method of such a microbattery according to the appended claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS OF THE INVENTION

Figure 1:
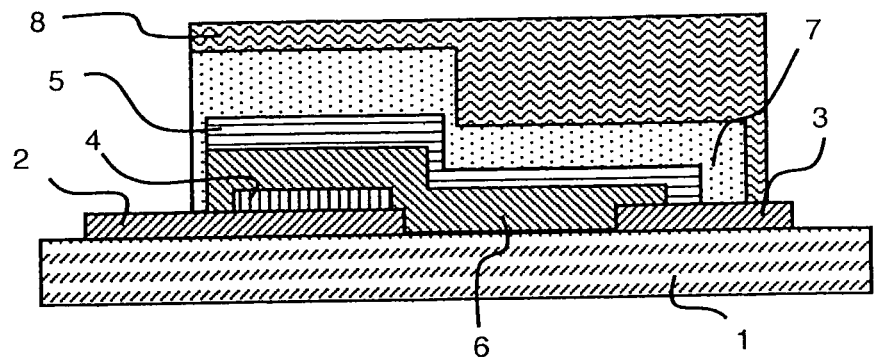
FIG. 1 represents a particular embodiment of a lithium microbattery according to the invention, in schematic manner in cross-section.

According to a particular embodiment represented in FIG. 1, the microbattery is formed by a stack of successive layers on a substrate 1, preferably a silicon substrate, able to contain an integrated circuit (not represented). Two metallic current collectors 2 and 3, with a thickness of 200 nm, for example made of platinum, tungsten, titanium or gold, are formed on substrate 1. A positive electrode 4 is located on first collector 2 and covered by a solid electrolyte 6 which separates positive electrode 4 from a negative electrode 5. Positive electrode 4 is formed by a material having a good electronic and ionic conductivity, for example titanium oxysulfide (TiOS), vanadium pentoxide ($V_2O_5$) or titanium disulfide ($TiS_2$). Negative electrode 5 is preferably metal lithium having a thickness of about 3.5 µm. Electrolyte 6 is an insulator having a high ionic conductivity such as lithium and phosphorus oxynitride (LiPON). As represented in FIG. 1, this electrolyte 6 totally covers positive electrode 4, a part of substrate 1 situated between the two collectors 2 and 3, and a part of the first and second collectors 2 and 3. Negative electrode 5 further totally covers the surface of solid electrolyte layer 6 and a part of second collector 3. An encapsulating layer, formed by a protective layer 7 of polymer material capped by a barrier layer 8, encapsulates electrodes 4 and 5 and solid electrolyte 6 and partially covers first and second collectors 2 and 3.

Figure 2:
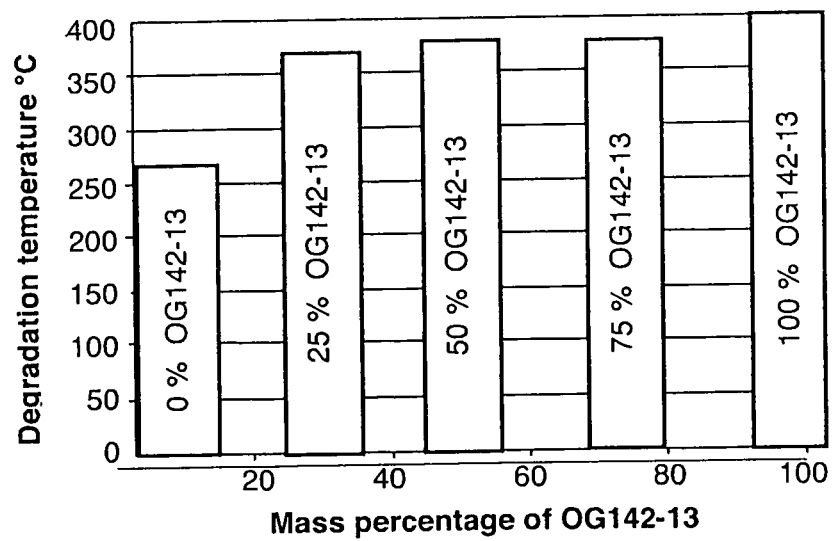
FIG. 2 represents the degradation temperature versus the mass percentage of the epoxide precursor OG142-13 of an acrylate/epoxide copolymer obtained from the 1,6-hexanediol diacrylate (HDODA)/diglycidylether of bisphenol A (DGEBA) precursors (OG142-13).

Protective layer 7 in contact with negative electrode 5 is an acrylate/epoxide copolymer, with a thickness preferably comprised between 2 and 5 µm. This protective layer 7 is perfectly compatible with the other layers of the microbattery and presents a good flexibility and a resistance to high temperatures i.e. greater than or equal to 360° C. The copolymer is formed from a homogeneous mixture of at least two photopolymerizable precursor materials, respectively acrylate-based and epoxide-based. The acrylate is advantageously aliphatic diacrylate, preferably 1,6-hexanediol diacrylate (HDODA). The epoxide is advantageously an aromatic polyepoxide, preferably diglycidylether of bisphenol A (DGEBA), marketed by Epoxy Technology under the brand-name "Epo-Tek OG142-13". To obtain a homogeneous HDODA/OG142-13 mixture, the quantity of HDODA is advantageously comprised between 25% and 75% by weight with respect to the total weight of the mixture, preferably 25%. As illustrated in FIG. 2, the HDODA/OG142-13 copolymer has a degradation temperature higher than or equal to 360° C. above 25% by weight of OG142-13 with respect to the total weight of the copolymer. The degradation temperature is measured from thermo-gravimetric analysis (TGA) of a thin film of the HDODA/OG142-13 copolymer. The properties of the copolymer thus obtained enable swelling of the stack formed by electrodes 4, 5 and solid electrolyte 6 to be compensated, while at the same time withstanding temperatures close to 360° C.

Barrier layer 8 is preferably made from metal, for example from titanium, tungsten, aluminium or platinum. It covers the whole of the surface of protective layer 7 so as to make the microbattery hermetic to air and water.

No degradation is observed in operation of the microbattery due to the flexibility of protective layer 7.

Furthermore, the encapsulating layer comprising such a protective layer 7 provides a better protection of the lithium microbattery against air than in the case of a protective layer made totally from a HDODA precursor or a OG142-13 precursor. The barrier level against water vapor for an encapsulating layer comprising a protective layer 7 in fact reaches a value of $8 \times 10^{-4}$ g/m$^2$/day of water vapor, for a HDODA proportion comprised between 25 and 75% by weight/total weight, whereas for polyacrylate (100% HDODA), the value is equal to $5 \times 10^{-3}$ g/m$^2$/day, and for polyepoxide (100% OG142-13) it is $10^{-3}$ g/m$^2$/day. Associating two precursors, HDODA and OG142-13, therefore induces a synergy effect.

In a variant, not represented, barrier layer 8 is formed by a stack of metal, ceramic or polymer layers.

Figure 3:
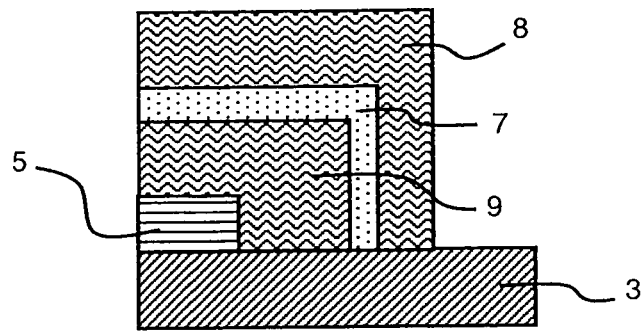
FIG. 3 represents a variant of the microbattery according to FIG. 1, in enlarged partial cross-section.

According to a variant represented in FIG. 3, a metal layer 9 covers negative electrode 5 so as to be inserted between negative electrode 5 and protective layer 7 and to come into contact with second current collector 3. Metal layer 9, for example made from titanium, advantageously has a thickness of 200 nm and is inert with respect to negative electrode 5. It protects negative electrode 5 temporarily and also improves the electric contact between this electrode 5 and second current collector 3.

According to a particular fabrication method, a stack of thin layers is made on substrate 1 by PVD or CVD and successive patternings of the layers according to any known method, advantageously by photolithography. This stack comprises a thin layer with a thickness of 200 nm, patterned to form first and second current collectors 2 and 3 spaced apart from one another on the substrate. It then comprises a thin layer with a thickness of 1.5 μm forming positive electrode 4 and a thin layer forming solid electrolyte 6. Positive electrode 4 is formed solely on first current collector 2 and is covered by the thin layer of solid electrolyte 6.

Negative electrode 5 is then deposited advantageously by evaporation through a mechanical mask to form a homogeneous thin layer with a thickness of 3.5 μm so as to cover the whole of electrolyte 6.

A homogeneous liquid mixture 10 of the two precursors of protective layer 7 is made by mixing 2.5 g of HDODA and 7.5 g of OG142-13 during 5 mins, with a stirring rate comprised between 1000 and 1500 rpm and at ambient temperature. The homogeneous solution obtained has a dynamic viscosity comprised between 0.1 and 0.4 Pa·s, preferably equal to 0.25 Pa·s.

Figure 4:
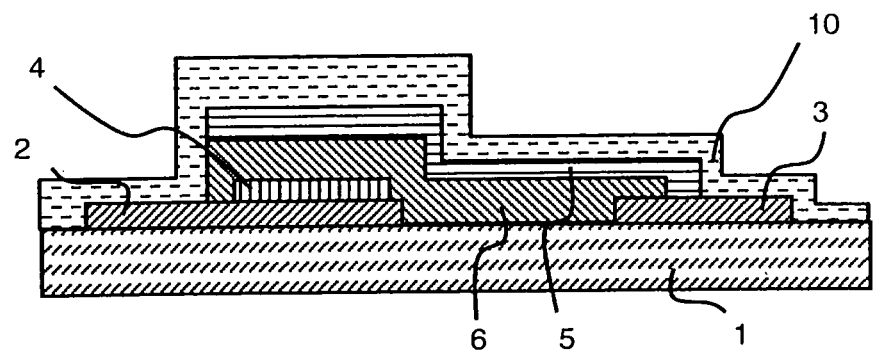
FIGS. 4 to 6 represent different steps of a first fabrication method of a microbattery according to FIG. 1, in schematic manner in cross-section.
Figure 5:
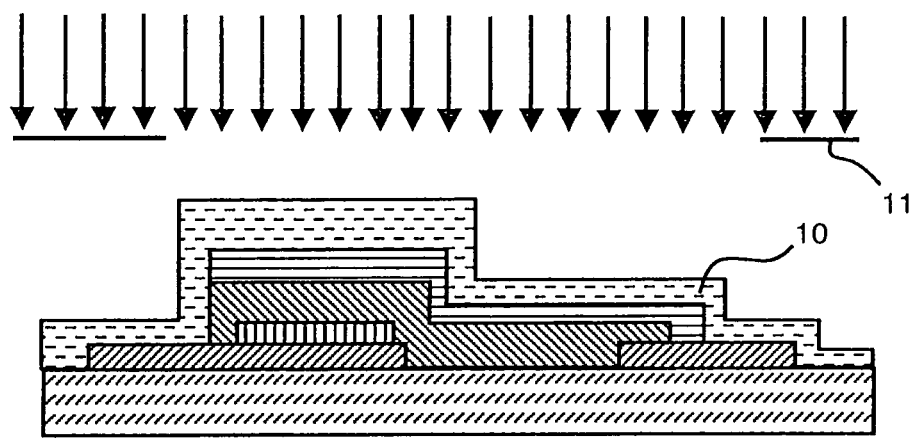
Figure 6:
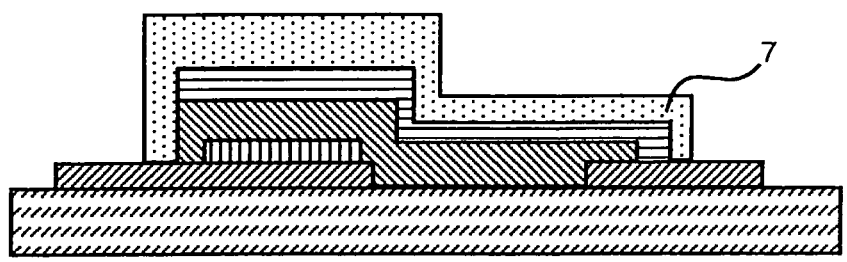

As represented in FIG. 4, homogeneous mixture 10 thus obtained is advantageously spread in the form of a thin layer over the whole of the surface of the previously described stack, for example by spin coating or by serigraphy. Then the layer of homogeneous mixture is photopolymerized. The thickness of protective layer 7, comprised between 2 and 5 μm, is controlled by adjusting the deposition rate. As represented in FIG. 5, layer 10 of homogeneous mixture is photopolymerized by irradiation by UV radiation or by an e-beam. This photopolymerization is performed through a pattern 11 in order not to polymerize an area of layer of homogeneous mixture 10 covering a part of the first and second current collectors 2 and 3. Photopolymerization is therefore localized on a part of layer of homogeneous mixture 10 covering electrode positive 4, electrolyte 6, negative electrode 5 and only a part of the two collectors 2 and 3. To obtain a protective layer 7 having a thickness of 4 μm from a 75% HDODA/25% OG142-13 mixture, homogeneous mixture 10 is for example spin coated on a silicon substrate having a diameter of 150 mm, at a speed of 4000 rpm, and is then subjected to UV exposure for 1 minute. Protective layer 7 obtained then has a homogeneity of more than 95%. The non-photopolymerized part of layer of homogeneous mixture 10 is then removed (FIG. 6).

A barrier layer with a thickness of 200 nm is then deposited by any known method on the whole of protective layer 7 and preferably only on a part of second current collector 3, thereby allowing access to current collectors 2 and 3 for subsequent connection, while at the same time encapsulating the parts of the microbattery that are sensitive to air.

Figure 7:
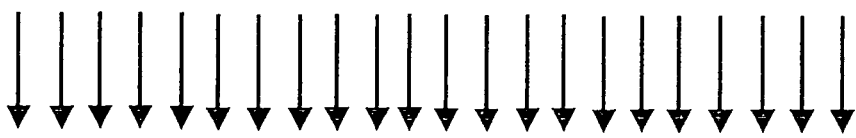
FIGS. 7 to 9 represent different steps of a second fabrication method of the microbattery of FIG. 1, in schematic manner in cross-section.
Figure 7:
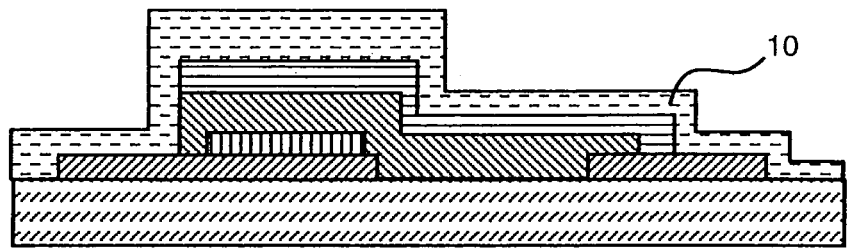
Figure 8:
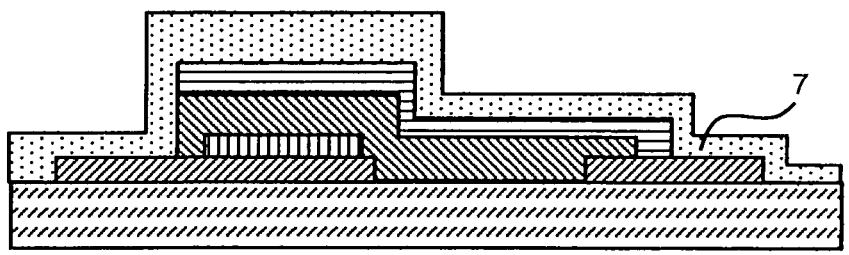
Figure 9:
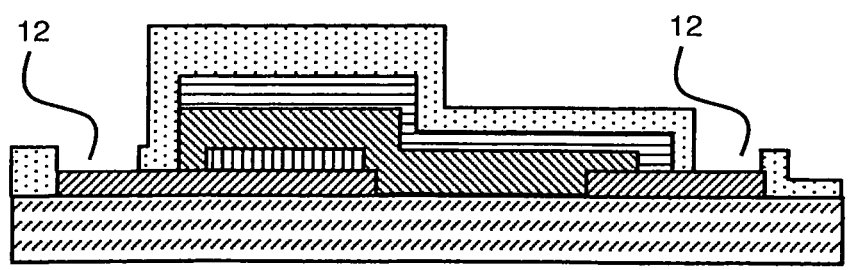

According to a variant, prior to formation of barrier layer 8, the whole of the layer of homogeneous mixture 10 is subjected to irradiation, as represented in FIG. 7, to obtain a protective layer 7 over the whole of the stack described above (FIG. 8). One or more openings 12 are then made in protective layer 7, by selective dry etching for example with an oxygen $O_2$ plasma, to free a part of the surface of first and second collectors 2 and 3.

Producing protective layer 7 implements conventional spin coating, serigraphy and/or photolithography techniques that are advantageously integrated in a microbattery fabrication method. Furthermore, the photopolymerization performed at ambient temperature is suitable for lithium, which is thermally unstable. Unlike prior art methods, the risks of contamination of the lithium microbattery are reduced as, in the manufacturing chain, protective layer 7 is produced on the same station as that used for the other layers and consequently does not require any risky transfer operation to another station. Moreover, the microbattery comprising protective layer 7 described above presents a thermal resistance enabling subsequent connection of current collectors 2 and 3 by solder reflow and an enhanced lifetime.

The invention claimed is:

1. A fabrication method of a lithium microbattery comprising the following successive steps:
   fabricating a stack formed by a first current collector and second current collector, a positive electrode, a solid electrolyte, and a negative electrode, on a support;
   depositing on the stack a thin layer of a homogeneous mixture comprising 1,6-hexanediol diacrylate (HDODA) and diglycidylether of bisphenol A (DGEBA);
   photopolymerizating at least a part of the layer of the homogeneous mixture, so as to form a protective layer; and
   forming a barrier layer in direct contact with the protective layer, the protective layer being capped by the barrier layer, the barrier layer and the protective layer forming an encapsulating layer.

2. The fabrication method according to claim 1, wherein photopolymerization is localized on a part of the layer of the homogeneous mixture covering the positive electrode, the electrolyte, the negative electrode, and only a part of the two collectors, the method then comprising removing a non-photopolymerized part of the homogeneous mixture before formation of the barrier layer.

3. The fabrication method according to claim 1, wherein photopolymerization is performed on the whole of the layer of the homogeneous mixture and is followed by selective dry etching, before formation of the barrier layer.

4. The fabrication method according to claim 3, wherein the selective dry etching is performed with $O_2$ plasma.

5. The fabrication method of claim 1, wherein the homogeneous mixture contains between 25% and 75% by weight of 1,6-hexanediol diacrylate with respect to a total weight of the mixture.

6. The fabrication method of claim 1, wherein the mixture is liquid and has a dynamic viscosity of from 0.1 Pa·s to 0.4 Pa·s.

7. The fabrication method of claim 1, wherein the barrier layer is a metal layer.

* * * * *